(12) United States Patent
Matsuoka et al.

(10) Patent No.: US 8,199,182 B2
(45) Date of Patent: Jun. 12, 2012

(54) EXPOSING DEVICE AND IMAGE FORMING APPARATUS

(75) Inventors: Yoshiyuki Matsuoka, Tokorozawa (JP); Isao Ebisawa, Hamura (JP); Kenji Kobayashi, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/013,703

(22) Filed: Jan. 25, 2011

(65) Prior Publication Data

US 2011/0116819 A1 May 19, 2011

Related U.S. Application Data

(62) Division of application No. 12/204,130, filed on Sep. 4, 2008, now Pat. No. 7,898,562.

(30) Foreign Application Priority Data

Sep. 5, 2007 (JP) ................................ 2007-230575
Sep. 5, 2007 (JP) ................................ 2007-230576

(51) Int. Cl.
*B41J 2/47* (2006.01)
(52) U.S. Cl. ...................................................... 347/252
(58) Field of Classification Search .................. 347/131, 347/144, 240, 236–238, 241, 246, 247, 251–254
See application file for complete search history.

(56) References Cited

U.S. PATENT DOCUMENTS

| 6,121,996 A | 9/2000 | Gelbart |
| 6,330,011 B1 | 12/2001 | Taira et al. |
| 6,646,670 B2 * | 11/2003 | Toyohara et al. ............. 347/244 |
| 2005/0146597 A1 * | 7/2005 | Seto ............................. 347/246 |

FOREIGN PATENT DOCUMENTS

| JP | 57-026875 A | | 2/1982 |
| JP | 57-130064 A | | 8/1982 |
| JP | 64-27945 A | | 1/1989 |
| JP | 8-224903 A | | 9/1996 |
| JP | 9-277589 A | | 10/1997 |
| JP | 09277589 A | * | 10/1997 |
| JP | 2004-327217 A | | 11/2004 |

* cited by examiner

*Primary Examiner* — Hai C Pham
(74) *Attorney, Agent, or Firm* — Holtz, Holtz, Goodman & Chick, PC

(57) ABSTRACT

An exposing device which radiates light on a photoconductor drum which rotates, thereby executing exposure, includes a light-emitting element unit including light-emitting element having an emission area which emits light that is generated, the emission area having a rectangular shape with a long side along a direction perpendicular to a rotational direction of the photoconductor drum, and a short side along the rotational direction, a lens unit which focuses the light, which is emitted from the emission area, on a peripheral surface of the photoconductor drum, thereby executing exposure, and forming on the peripheral surface a beam spot, and a driving circuit which causes the light-emitting element to emit light, thereby making a width of the shape of the beam spot in a direction along the rotational direction close to a width of the beam spot in a direction perpendicular to the rotational direction.

14 Claims, 9 Drawing Sheets

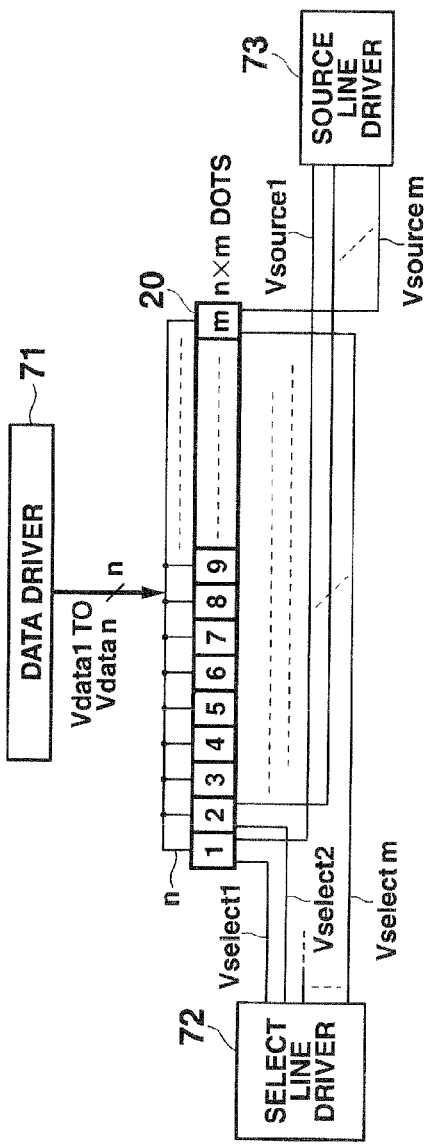
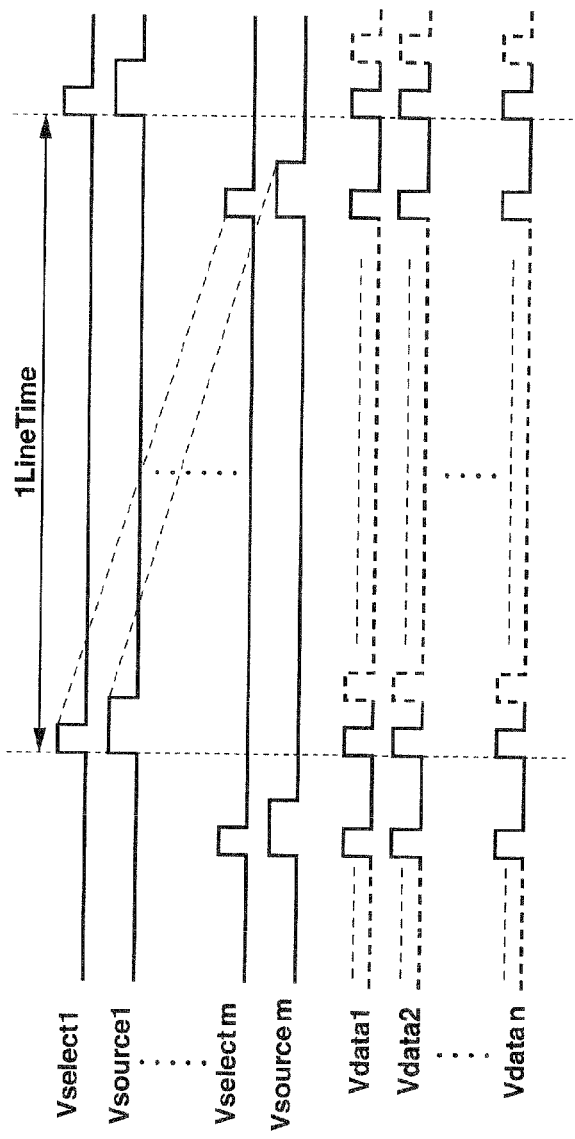
FIG.6A
FIG.6B

MAIN SCAN DIRECTION

MAIN SCAN DIRECTION

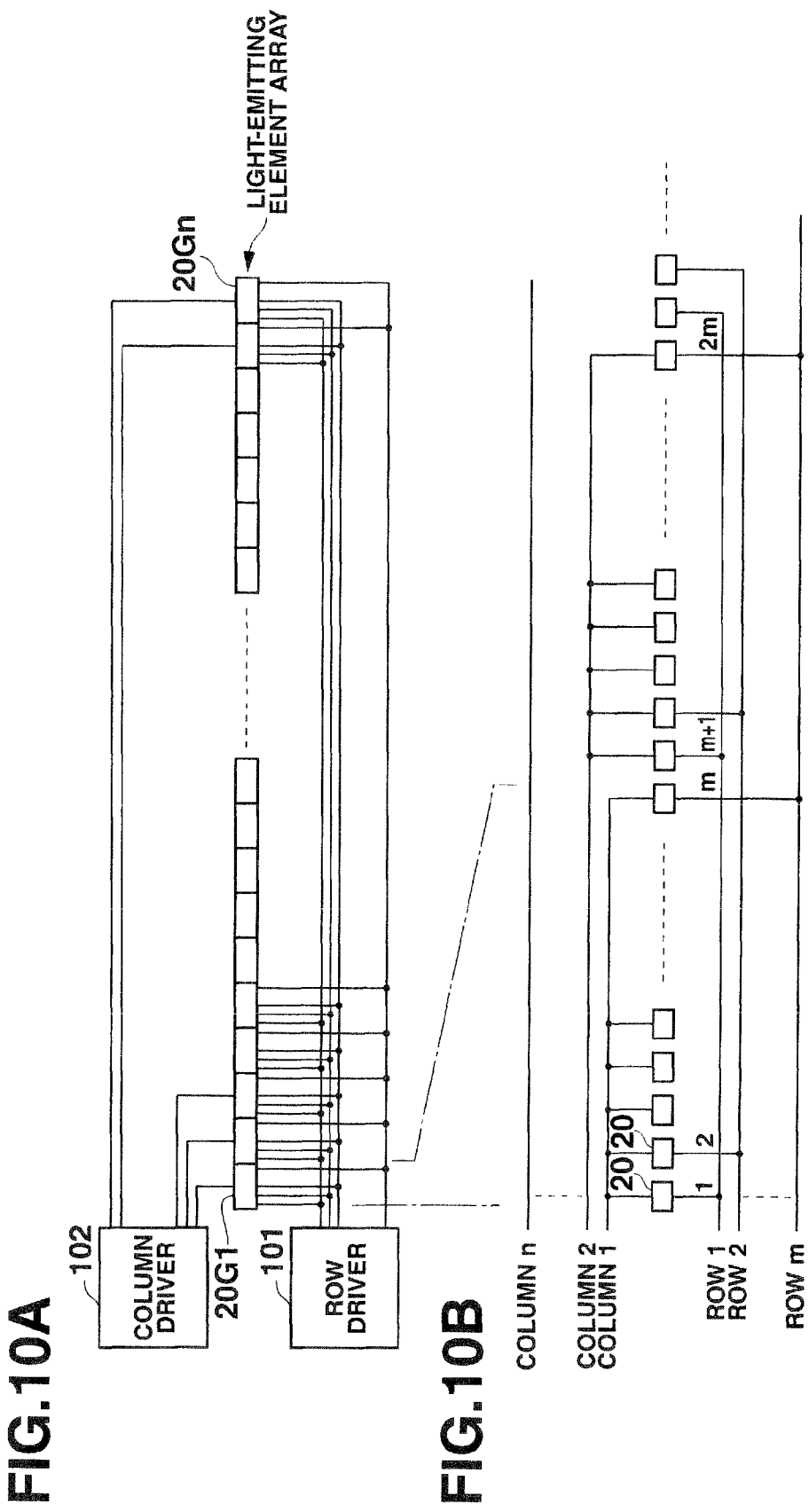

90B
LIGHT-EMITTER
MAIN SCAN DIRECTION

PA
MAIN SCAN DIRECTION

EXPOSING DEVICE AND IMAGE FORMING APPARATUS

CROSS-REFERENCE TO RELATED APPLICATIONS

This application is a Divisional Application of U.S. application Ser. No. 12/204,130, filed Sep. 4, 2008 now U.S. Pat. No. 7,898,562, which is based upon and claims the benefit of priority from prior Japanese Patent Applications No. 2007-230575, filed Sep. 5, 2007; and No. 2007-230576, filed Sep. 5, 2007, the entire contents of all three of which are incorporated herein by reference.

BACKGROUND OF THE INVENTION

1. Field of the Invention

The present invention relates generally to an exposing device which adopts an electrophotographic method, and an image forming apparatus including the exposing device, and more particularly to an exposing device using a light-emitting element as an exposure light source, an image forming apparatus including the exposing device, and a driving control method of the image forming apparatus.

2. Description of the Related Art

Various kinds of electrophotographic image forming apparatuses (printing apparatuses), wherein organic electroluminescence (hereinafter referred to as "organic EL") elements, for instance, are used as light-emitting elements, have been designed and manufactured as products. This type of image forming apparatus is configured such that a light-emitting element array, which is composed of a plurality of light-emitting elements, and a photoconductor drum are disposed via a lens, with a predetermined distance therebetween. Light emitted from each light-emitting element is focused via the lens, and radiated on the photoconductor, thus forming an electrostatic latent image.

Conventionally, the shape of a part, which emits light from each of the light-emitting elements of the light-emitting element array, is, in general, substantially squared. Ideally, such design is made that light emitted from the light-emitting element is focused on the peripheral surface of the photoconductor drum via the lens, thereby exposing the photoconductor and forming a substantially circular beam spot on the photoconductor drum.

A rod lens array, which is composed of a plurality of arrayed rod lenses, is used as the lens that is used in the above-described image forming apparatus. In the case of the rod lens array, it is very difficult, for the reason of manufacture, to uniformize the optical characteristics of respective rod lenses, such as refractive index distributions and tilt angles of optical axes. Consequently, the shapes of beam spots, which are actually formed on the photoconductor drum via the respective rod lens of the rod lens array, have some distortions associated with the respective rod lenses. As a result, the uniformity in print density corresponding to the respective light-emitting elements is degraded, leading to non-uniformity in print results.

BRIEF SUMMARY OF THE INVENTION

The present invention has advantages in that in an exposing device which radiates light on a photoconductor drum and exposes the photoconductor drum, an image forming apparatus including the exposing device, and a driving control method of the image forming apparatus, the influence of the distortion of the shape of the beam spot, which is formed on the photoconductor drum, due to the presence of an interposed rod lens array, can be suppressed, thereby enhancing the uniformity in print density and suppressing occurrence of non-uniformity in a print result.

In order to obtain the above advantages, according to the present invention, there is provided an exposing device which radiates light on a photoconductor drum which rotates, thereby executing exposure, comprising: a light-emitting element unit including at least one light-emitting element having an emission area which emits light that is generated, the emission area having a rectangular shape with a long side along a direction perpendicular to a rotational direction of the photoconductor drum, and a short side along the rotational direction, the short side being shorter than the long side; a lens unit which focuses the light, which is emitted from the emission area of the light-emitting element unit, on a peripheral surface of the photoconductor drum, thereby executing exposure, and forming on the peripheral surface a beam spot having a shape corresponding to the shape of the emission area; and a driving circuit which controls a timing of light emission of the light-emitting element of the light-emitting element unit and causes the light-emitting element to emit light, thereby making a width of the shape of the beam spot in a direction along the rotational direction close to a width of the beam spot in a direction perpendicular to the rotational direction.

In order to obtain the above advantages, according to the present invention, there is provided an image forming apparatus which performs printing by an electrophotographic method on the basis of image data, comprising: a photoconductor drum which rotates; a light-emitting element unit including a plurality of light-emitting elements each having an emission area which emits light that is generated, the emission area having a rectangular shape with a long side along a direction perpendicular to a rotational direction of the photoconductor drum, and a short side along the rotational direction, the short side being shorter than the long side; a lens unit which focuses the light, which is emitted from the emission area of each of the light-emitting elements, on a peripheral surface of the photoconductor drum, thereby executing exposure, and forming on the peripheral surface a plurality of beam spots each having a shape corresponding to the shape of the emission area; and a driving circuit which controls a timing of light emission of each of the light-emitting elements of the light-emitting element unit on the basis of the image data, and causes each of the light-emitting elements to emit light, thereby making a width of the shape of each beam spot in a direction along the rotational direction close to a width of the beam spot in a direction perpendicular to the rotational direction.

In order to obtain the above advantages, according to the present invention, there is provided a driving control method of an image forming apparatus which performs printing by an electrophotographic method on the basis of image data, the image forming apparatus including a light-emitting element unit including a plurality of light-emitting elements each having an emission area which emits light that is generated, the emission area having a rectangular shape with a long side along a direction perpendicular to a rotational direction of a photoconductor drum which rotates, and a short side along the rotational direction, the short side being shorter than the long side, the method comprising: a step of causing each of the light-emitting elements of the light-emitting element unit to execute light emission, focusing the light, which is emitted from the emission area, on a peripheral surface of the photoconductor drum via a lens unit, thereby executing exposure, and forming on the peripheral surface a beam spot having a shape corresponding to the shape of the emission area; and a step of controlling a timing of light emission of each of the light-emitting elements, thereby making a width of the shape of the beam spot in a direction along the rotational direction close to a width of the beam spot in a direction perpendicular to the rotational direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6A and FIG. 6B show the structure of a driving circuit for driving the pixels of a light-emitting element array according to the first embodiment, and an example of the driving waveforms of the driving circuit;

FIG. 10A and FIG. 10B are views for describing the structure of a driving circuit for driving the light-emitting elements of the light-emitting element array according to the second embodiment.

DETAILED DESCRIPTION OF THE INVENTION

An exposing device, an image forming apparatus (printing apparatus) including the exposing device and a driving control method of the image forming apparatus, according to the present invention, will now be described in detail, on the basis of embodiments shown in the accompanying drawings.

First Embodiment

To begin with, a first embodiment of the present invention is described.

Figure 1:
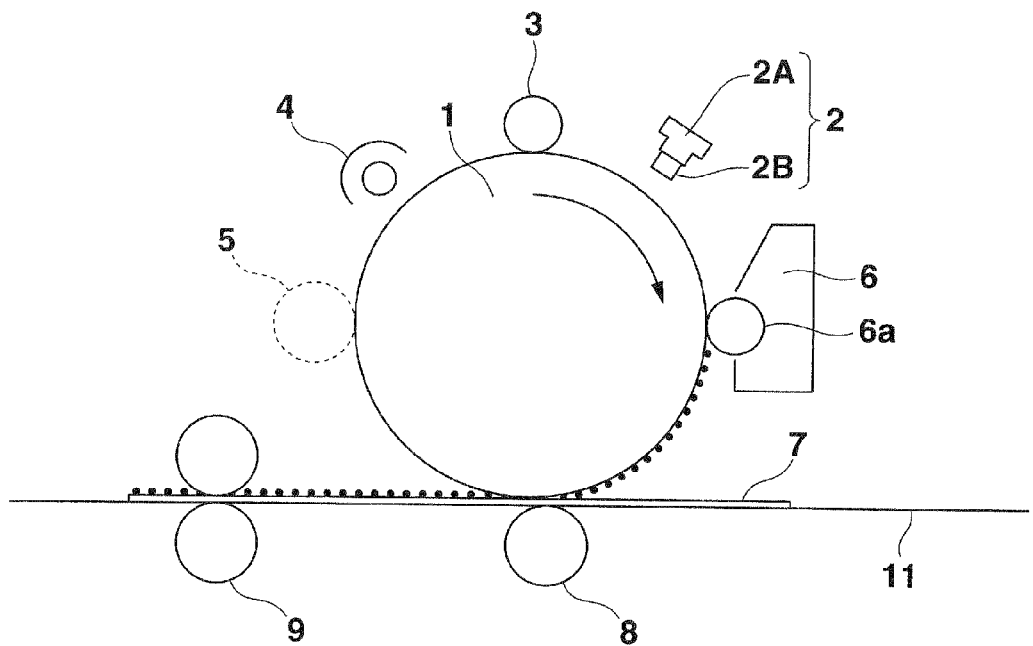
FIG. 1 shows a structure example of an image forming apparatus using an exposing device according to a first embodiment of the present invention.

FIG. 1 shows a structure example of an image forming apparatus using an exposing device according to the first embodiment of the present invention.

The image forming apparatus shown in FIG. 1 includes a photoconductor drum 1, an exposing device 2 in which a case unit 2A and a rod lens array unit 2B are integrally provided, a charging roller 3, an eraser light-source photoconductor 4, a cleaning member 5, a developer 6 including a developing roller 6a, a transfer roller 8, a fixing roller 9, and a convey belt 11. Reference numeral 7 denotes print paper.

The rod lens array unit 2B is a lens array in which SELFOC™ lenses are arranged in a line or lines, and is a lens unit which focuses incident light on the photoconductor drum 1 as an equal-size erect image.

The photoconductor drum 1 is a negative-charge-type OPC (Organic Photo-Conductor), and the charging roller 3 is configured as a negative charger in association with the photoconductor drum 1. As will be described later in detail, the exposing device 2 includes a light-emitting element array which is configured such that a plurality of light-emitting elements are linearly arranged.

In the image forming apparatus shown in FIG. 1, in general terms, printing is performed by the following process. To start with, the charging roller 3 comes in contact with the surface of the photoconductor drum 1 which rotates. Thereby, the surface of the photoconductor drum 1, which is put in contact with the charging roller 3, is uniformly negatively charged. Then, the exposing device 2 radiates light on the photoconductor drum 1, and forms an electrostatic latent image on that area of the photoconductor drum 1, on which light is radiated. Subsequently, by the developer 6, toner is adhered to the electrostatic latent image. The transfer roller 8 transfers the toner, which adheres to the electrostatic latent image, onto the print paper 7. This printing process will be described below in detail.

To start with, a negative high voltage, which is supplied from a charging power supply (not shown), is applied to the photoconductor drum 1 by the charging roller 3. Thereby, the peripheral surface of the photoconductor drum 1 is uniformly negatively charged, and is set in an initialized charge state in which the peripheral surface is initialized in terms of potential.

Light corresponding to image data is radiated from the emission area of the exposing device 2 onto the photoconductor drum 1 with the peripheral surface in the initialized charge state, and write (exposure) is executed. Thereby, an electrostatic latent image is formed on the peripheral surface of the photoconductor drum 1. The electrostatic latent image comprises a negative high potential part which is formed by the initializing charging, and a negative low potential part of, e.g. about −50V, which is formed on an area (beam spot) on which light is radiated by the exposure.

Toner, which is contained in the developer 6 and is charged with a low negative potential, is conveyed by the rotation of the developing roller 6a to a part at which the developing roller 6a and the photoconductor drum 1 are mutually opposed. At this time, a developing bias voltage of, e.g. about −250V is applied from a power supply (not shown) to the developing roller 6a. Accordingly, a potential difference of about 200V is created between the developing roller 6a, to which the developing bias voltage of about −250V is applied, and the negative low potential part of about −50V of the electrostatic latent image on the photoconductor drum 1.

By this potential difference from the developing voltage on the electrostatic latent image, the negatively charge toner is transferred to the negative low potential part of the electrostatic latent image, which has a positive potential relative to the developing roller 6a, and thus a toner image is formed. The toner image is conveyed by the rotation of the photoconductor drum 1 to a transfer part at which the photoconductor drum 1 and the transfer roller 8 are mutually opposed.

The amount of toner of the formed toner image, that is, the density of the developed image, is determined by the amount of attenuation of potential on the peripheral surface of the photoconductor drum 1, which occurs in accordance with the exposure amount on the photoconductor drum 1 by the light-emitting elements of the exposing device 2.

When the toner image is conveyed to the transfer part, as described above, the print paper 7 is conveyed to the transfer part by the convey belt 11. At the transfer part, the toner image is transferred to the print paper 7 by the transfer roller 8. The print paper 7, to which the toner image is transferred in this manner, is further conveyed to the downstream side by the convey belt 11. After the toner image is thermally fixed by the fixing roller 9, the print paper 7 is discharged to the outside of the image forming apparatus.

After the toner image is transferred onto the print paper 7, the residual toner is removed from the peripheral surface of the photoconductor drum 1 by the cleaning member 5. Further, the charge on the peripheral surface of the photoconductor drum 1 is uniformly erased to 0V by the eraser light-source photoconductor 4 in preparation for the charging by the charging roller 3.

In the case unit 2A of the exposing device 2, the light-emitting element array is provided. The light-emitting element array is configured such that a plurality of light-emitting elements are linearly arranged, for example, in a line along the axial direction of the photoconductor drum 1, which is the main scan direction of the exposure scan on the photoconductor drum 1 shown in FIG. 1.

Next, the basic structure of an organic EL element, which is applied to each of the light-emitting elements of the light-emitting element array, is described.

Figure 2:
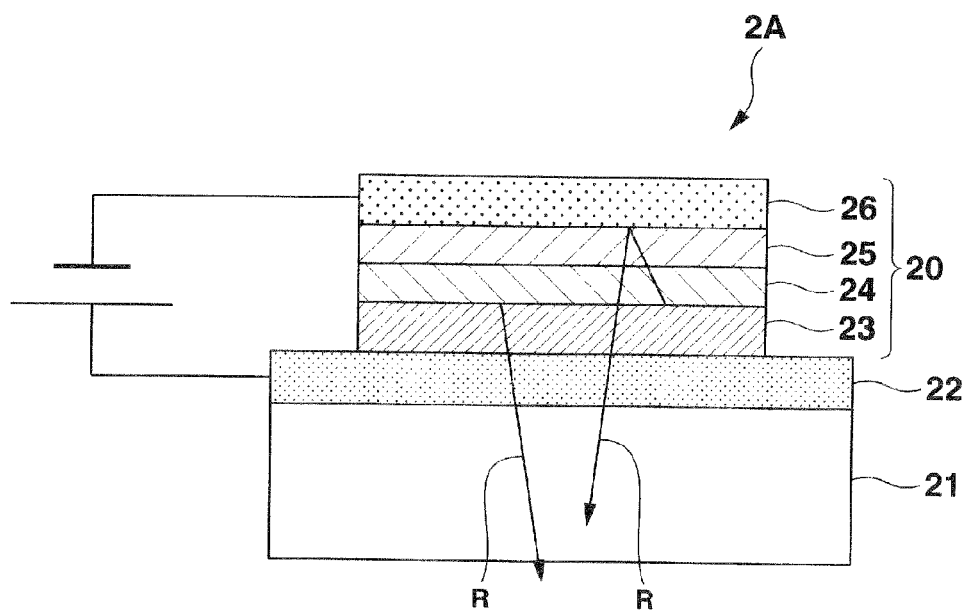
FIG. 2 shows a basic structure of an organic EL element according to the first embodiment.

FIG. 2 shows the basic structure of the organic EL element according to the embodiment.

As shown in FIG. 2, in the organic EL element 20, a pixel electrode (anode) 22, a hole transport layer (HTL) 23, a light-emitting layer (EL) 24, and an electron transport layer (ETL) 25 and a counter-electrode (cathode) 26 are formed in the named order on a transparent substrate 21 which is formed of, e.g. a glass substrate. Additionally, a counter-substrate (not shown) for sealing these components may be provided.

It is assumed that the organic EL element shown in FIG. 2 adopts a bottom emission structure in which light generated from the light-emitting layer 24 is emitted from the transparent substrate 21 side. Alternatively, the organic EL element may adopt a top emission structure in which the light is emitted from the side opposite to the transparent substrate 21.

The pixel electrode 22 functions as an anode. In the case of the bottom emission structure that is shown, the pixel electrode 22 is formed of a transparent, electrically conductive metal oxide film including a transparent electrode material such as indium thin oxide (ITO) or indium zinc oxide (IZO).

In this case, the counter-electrode 26 functioning as a cathode is formed of a multilayer reflective structure comprising an electron injection layer with a low signal function of, e.g. barium, magnesium or lithium, as a lower layer, and a light-reflective metal layer with a high signal function of, e.g. aluminum, as an upper layer, or the counter-electrode 26 is formed of a single layer of a reflective metal layer of, e.g. an aluminum alloy. Thereby, light R from the light-emitting layer 24 is reflected, as shown in FIG. 2, and, as a result, the light is emitted to the transparent substrate 21 side. In the organic EL element 20, light is emitted to the transparent substrate 21 side from the region where the pixel electrode 22 and the counter-electrode 26 are mutually opposed, and light is emitted from the region where the pixel electrode 22 and the counter-electrode 26 are mutually opposed. In the present embodiment, as will be described later, such a structure is adopted that an area of light emission is restricted by providing, for example, a light-blocking film on a part on the light emission side, and the size and shape of the emission area are set at desired dimensions.

In the case of adopting a top emission structure instead of the bottom emission structure shown in FIG. 2, the top emission structure is realized by forming the counter-electrode 26 as an anode and the pixel electrode 22 as a cathode, and interchanging the above-described structural components of the counter-electrode 26 and pixel electrode 22.

In this case, the carrier transport layer, which is in contact with the pixel electrode 22, is formed as an electron transport layer, and the carrier transport layer, which is in contact with the counter-electrode 26, is formed as a hole transport layer.

The light-emitting layer 24 includes an organic material which recombines holes that are transported from the hole transport layer (HTL) 23 and the electrons that are transported from the electron transport layer (ETL) 25, thereby generating light.

The organic EL element 20 has been described as adopting the three-layer structure comprising the hole transport layer 23, light-emitting layer 24 and electron transport layer 25. However, the present invention is not limited to this layer structure. For example, the organic EL element 20 may adopt a two-layer structure comprising a hole transport layer and an electron transport layer, a single-layer structure comprising a hole/electron transport layer, a two-layer structure comprising a hole-transporting light-emitting layer and an electron transport layer, or a structure in which some other carrier transport layer is provided between these layers. In the present embodiment, the carrier transport layers, such as the hole transport layer 23, light-emitting layer 24 and electron transport layer 25, are collectively referred to as "EL layer".

When a predetermined voltage is applied between the pixel electrode 22 and counter-electrode 26, holes are injected in the light-emitting layer 24 from the pixel electrode 22, and electrons are injected in the light-emitting layer 24 from the counter-electrode 26. Thereby, the holes and electrons are recombined in the light-emitting layer 24, and light is generated.

In the case of the bottom emission structure shown in FIG. 2, the light R produced by this light generation passes through the pixel electrode 22 and transparent substrate 21, and is perfect-diffused and radiated. On the other hand, in the case of the top emission structure, the light R from the light-emitting layer 24 passes through the counter-electrode 26 is perfect-diffused and radiated.

In the above-described electrophotographic image forming apparatus, the exposing device 2 executes write of light on the photoconductor drum 1 according to image data. It is difficult to form, by only the case unit 2A side of the exposing device 2 without any focusing optical system structure, a small-diameter light spot on the photoconductor of the photoconductor drum 1 which is disposed with a distance of several mm from the exposing device 2, and to form a beam spot which resolves a dot of each light-emitting element. Taking this into account, in the present invention, the beam spot is realized by combining the rod lens array unit 2B with the case unit 2A.

Next, the specific structure of the exposing device 2 is described.

Figure 3:
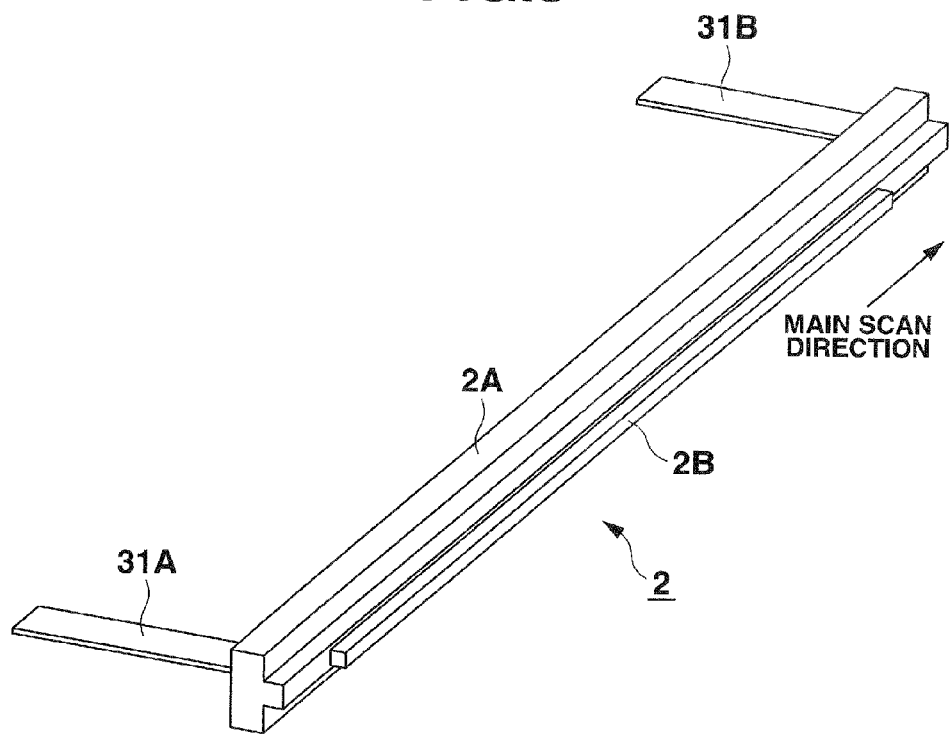
FIG. 3 is a perspective view showing the external structure of the exposing device according to the first embodiment.

FIG. 3 is a perspective view showing the external structure of the exposing device according to the present embodiment.

Figure 4:
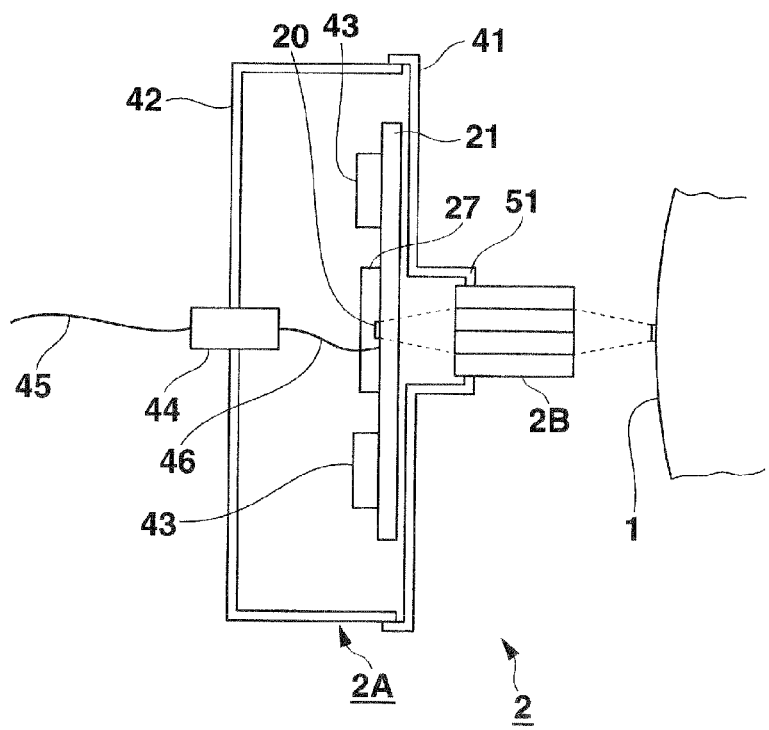
FIG. 4 is a cross-sectional view showing the structure of the exposing device according to the first embodiment, as viewed from the lateral side.

FIG. 4 is a cross-sectional view showing the structure of the exposing device according to the embodiment, as viewed from the lateral side.

As shown in FIG. 3, the exposing device 2 includes the light-emitting element array in which a plurality of light-emitting elements are linearly arranged, for example, in a line, along the main scan direction of recording scan (the axial direction of the photoconductor drum 1). The light-emitting element array includes about 14000 light-emitting elements, assuming that the image forming apparatus can perform printing with a print density of 1200 dpi over the full width of the photoconductor drum 1 by setting the vertical direction of print paper of, e.g. A4 size (297 mm (vertical)×210 mm (horizontal)) to accord with the axial direction of the photoconductor drum 1.

Each of the light-emitting elements of the light-emitting element array of the present embodiment is configured to include the organic EL element 20 shown in FIG. 2.

The organic EL element 20 of each light-emitting element is supplied with a control signal which is formed of a pulse voltage according to image data that is output from a host apparatus (not shown) which is externally connected to the image forming apparatus. Specifically, the light emission of each light-emitting element is selectively controlled. The details will be described later.

The organic EL element 20 is electrically connected to the above-described host apparatus via control cables 31A and 31B, as shown in FIG. 3.

As shown in FIG. 4, the transparent substrate 21 is adhered and fixed to a front case 41, which constitutes a part of the case unit 2A, by an adhesive resin (not shown). A rear case 42, which similarly constitutes a part of the case unit 2A, as shown in FIG. 4, is fitted in the front case 41. Specifically, the transparent substrate 21 is sealed and fixed in the case that is constituted by the front case 41 and rear case 42.

A seal glass 27, which constitutes a counter-substrate for sealing the organic EL element 20, is provided on that surface side of the transparent substrate 21, where the organic EL element 20 is provided. In addition, a plurality of driver ICs 43 are provided in a manner to avoid the seal glass 27. The driver ICs 43 are electrically connected to the pixel electrode 22 and counter-electrode 26 shown in FIG. 2.

A sync signal, a clock signal and an image signal are input from a controller (not shown) to the driver ICs 43. On the basis of these signals, the driver ICs 43 control the pixel electrode 22 and counter-electrode 26.

In the present embodiment, for the reason of the structure of the image forming apparatus, the exposing device 2 is formed as a single device unit. Consequently, at the time of assembly or replacement, some external force may act on connection wiring. Thus, cables are separately structured between the inside and outside of the case unit 2A, so that the cable on the outside of the case unit 2A may have a higher strength and the workability may be enhanced. For this purpose, as shown in FIG. 4, a relay connector 44 is provided on the rear case 42.

An external cable 45 is provided on the outside of the exposing device 2 via the relay connector 44, and a relay cable 46 is provided to connect the relay connector 44 and the driver ICs 43 on the transparent substrate 21. Thereby, the external cable 45, relay connector 45 and relay cable 46 constitute the control cables 31A and 31B shown in FIG. 3.

A projection portion 51, which projects toward the photoconductor drum 1, is provided on the front case 41. An opening portion is formed in the projection portion 51, and the rod lens array unit 2B is fitted in this opening portion so as to face the respective organic EL elements 20. The gap between the opening portion and the rod lens array unit 2B is sealed with an adhesive (not shown), and the rod lens array unit 2B is fixed.

Accordingly, even if the front case 41 is not transparent to visible light, the light emitted from the organic EL element 20 is made incident on the rod lens array unit 2B via the sealed space in the projection portion 51.

The organic EL element 20 shown in FIG. 4 has the bottom emission structure in which the transparent substrate 21 faces the rod lens array unit 2B. Alternatively, the organic EL element 20 may adopt the top emission structure in which the seal glass 27, which is the counter-substrate, is disposed to face the rod lens array unit 2B.

Next, the driving method of each light-emitting element of the light-emitting element array in this embodiment is described.

The light-emitting element array in the present embodiment is configured to include a plurality of light-emitting elements which are composed of organic EL elements, and a plurality of pixel driving circuits having active elements which are connected to the associated light-emitting elements and drive the light-emitting elements. The respective light-emitting elements are driven by an active driving method. The pixel driving circuit includes, for instance, a thin-film transistor (TFT) as the active element. In this description, one light-emitting element and one pixel driving circuit, which is connected to this light-emitting element, are referred to as one pixel, and the light-emitting element array is configured to include a plurality of pixels.

Figure 5A:
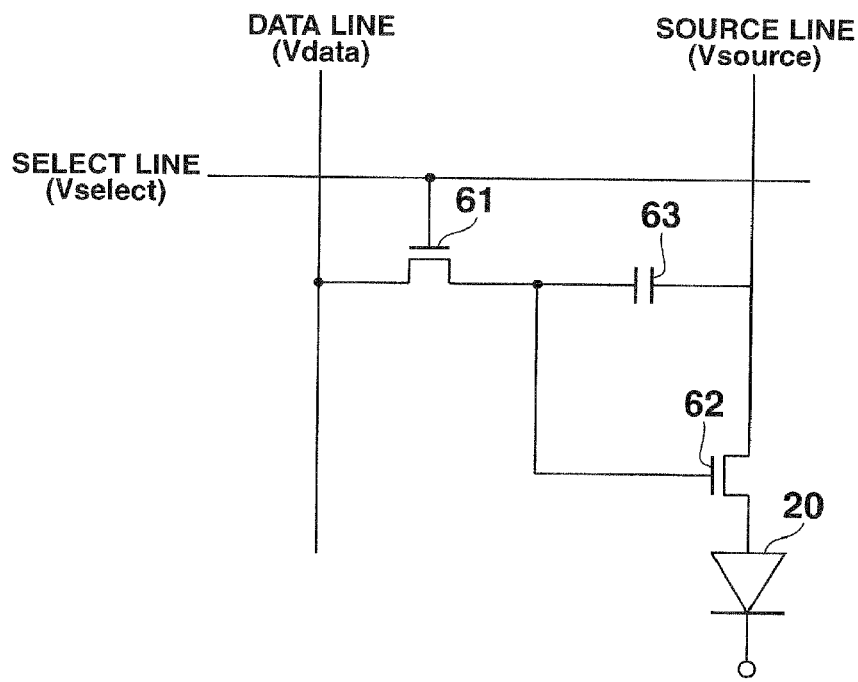
FIG. 5A and FIG. 5B show the structure of a pixel driving circuit of a pixel according to the embodiment, and an example of driving waveforms of the pixel driving circuit.
Figure 5B:
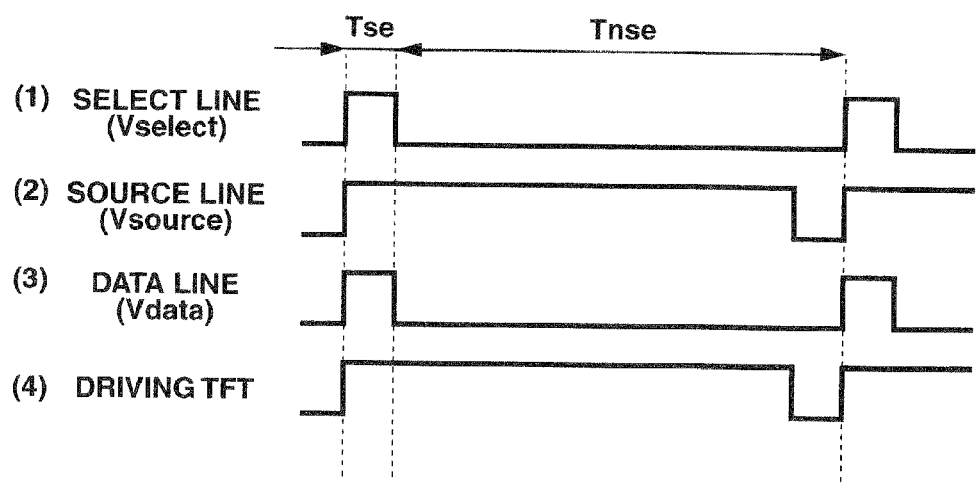

FIG. 5A and FIG. 5B show the structure of the pixel driving circuit of the pixel according to the embodiment, and an example of driving waveforms of the pixel driving circuit.

Specifically, the pixel driving circuit shown in FIG. 5A includes a select TFT 61, a driving TFT 62 and a storage capacitor 63. The drain of the driving TFT 62 is connected to the anode of the organic EL element 20.

In the driving waveforms shown in FIG. 5B, a part (1) shows a select signal Vselect which is applied to a select line, a part (2) shows a voltage signal Vsource which is applied to a source line, a part (3) shows a signal voltage Vdata which is applied to a data line, and a part (4) shows the waveform of a current flowing in the organic EL element 20 via the driving TFT 62.

Specifically, as shown in the part (1) of FIG. 5B, the select signal Vselect, which is applied to the select line, is set at a high level at a timing of a select period Tse. In addition, the voltage signal Vsource, which is applied to the source line, is set at a high level, as shown in the part (2) of FIG. 5B, and the signal voltage Vdata is applied to the data line, as shown in the part (3) of FIG. 5B. Then, the select TFT 61 is turned on and selected by the high-level select signal Vselect, and the signal voltage Vdata is written in the storage capacitor 63. At the same time, the driving TFT 62 is turned on. At this time, the gate voltage Vgs of the select TFT 61 is determined by the equation, $$Vgs = V\text{data} - V\text{source},$$

in accordance with the value of the signal voltage Vdata that is written in the storage capacitor 63, and thus the conductivity of the driving TFT 62 is determined. During the period in which the voltage signal Vsource that is applied to the source line is set at the high level, a current corresponding to the conductivity of the driving TFT 62 flows in the organic EL element 20.

Next, a description is given of the circuit structure of the driving circuit which drives the respective pixels of the light-emitting element array according to the present embodiment, and the driving method of the driving circuit.

FIG. 6A and FIG. 6B show the structure of the driving circuit for driving the pixels of the light-emitting element array according to the present embodiment, and an example of the driving waveforms of the driving circuit.

Specifically, FIG. 6A is a block diagram of the driving circuit for driving the pixels of the light-emitting element array. FIG. 6B shows the waveforms of respective pulse signals which are applied from a data driver 71, a select line driver 72 and a source line driver 73, which are shown in FIG. 6A, to the respective pixels of the light-emitting element array.

As is shown in FIG. 6A, the light-emitting element array of the exposing device 2 is divided into blocks each comprising an n-number of neighboring pixels (dots), and the light-emitting element array has an m-number of these blocks. Specifically, the total number of pixels (dots), which are arranged on the light-emitting element array, is n×m. The driving circuit is configured to include the data driver 71, select line driver 72 and source line driver 73.

The select line driver 72 has an m-number of outputs, and is connected to select lines of the respective blocks. As shown in FIG. 6B, the select line driver 72 successively applies select signals Vselect1 to Vselectm to the select lines of the respective blocks in every 1 line time which is allocated to 1-line printing with reference to a horizontal sync signal Hsync (not shown), and successively sets the first block, second block, ..., m-th block in the selected state by the select TFTs 61. The 1 line time, in this context, is a time allocated to 1-line exposure on the photoconductor drum 1.

The source line driver 72 has an m-number of outputs, and is connected to source lines of the respective blocks. As shown in FIG. 6B, the source line driver 73 successively applies voltage signals Vsource1 to Vsourcem to the source lines of the respective blocks in sync with the timing of the select signals Vselect1 to Vselectm.

The data driver 71 has an n-number of outputs, and is connected in parallel to data lines of an n-number of pixels of each block. As shown in FIG. 6B, the data driver 71 applies signal voltages Vdata1 to Vdatan, which correspond to image data, to each data line during the time period in which the select signal, Vselect1 to Vselectm, is set at the high level, thereby successively writing data corresponding to the image data in the pixels of each block.

Thereby, the light-emitting element of each pixel is on/off controlled once in every 1 line time in sync with these signals.

Next, a description is given of an example of the specific structure and shape of light-emitting elements which are arranged in one block of the light-emitting element array according to the present embodiment.

Figure 7A:
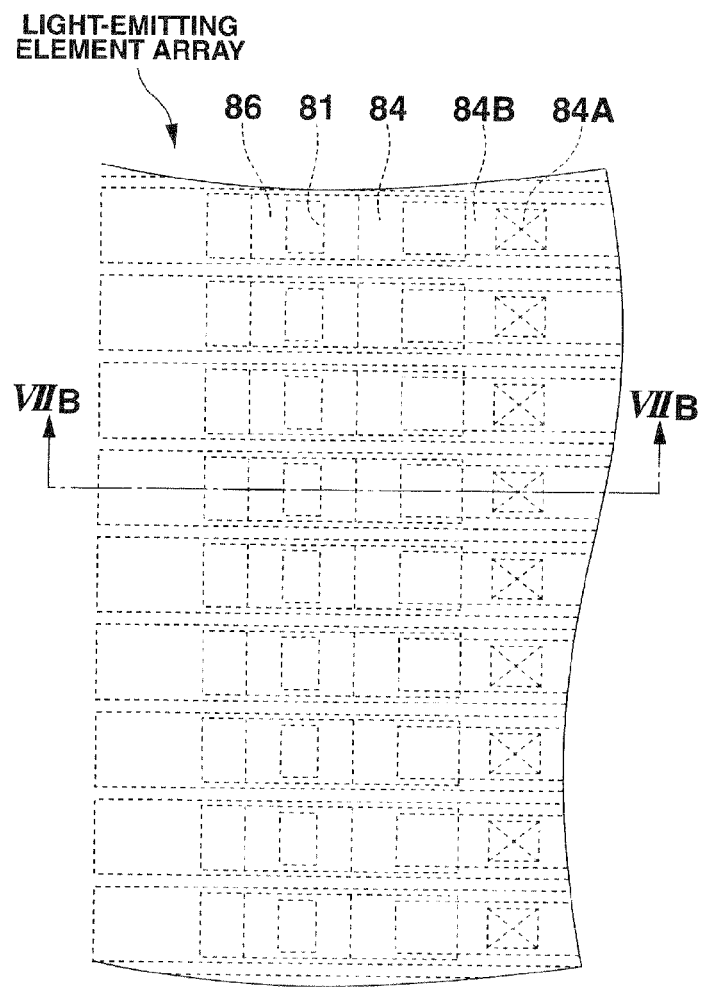
FIG. 7A and FIG. 7B are a partial schematic view showing the structure, as viewed from above, of those parts of the plural pixels arranged in one block of the light-emitting element array of the first embodiment, which constitute the light-emitting elements, and a cross-sectional view of this structure.
Figure 7B:
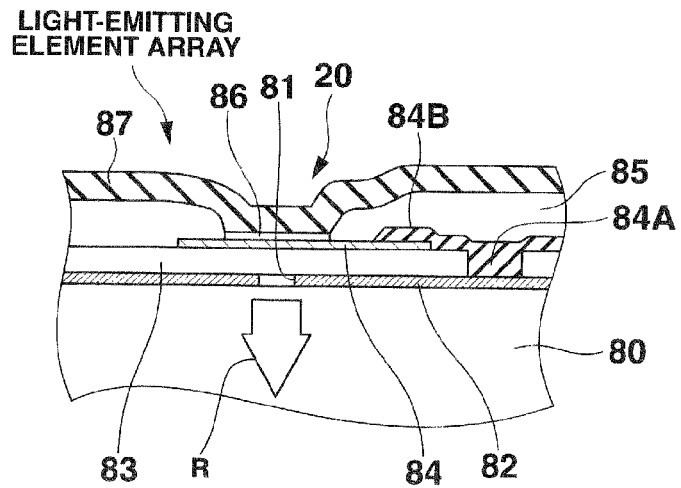

FIG. 7A and FIG. 7B are a partial schematic view showing the structure, as viewed from above, of those parts of the plural pixels arranged in one block of the light-emitting element array of the first embodiment, which constitute the light-emitting elements, and a cross-sectional view of this structure.

In the description below, the parts common to the structural elements of the basic structure of the organic EL element 20 shown in FIG. 2 are denoted by the corresponding reference numerals. FIG. 7A shows the arrangement structure of, e.g. various electrodes of the organic EL element 20, in the state in which a cathode 87 and an overcoat insulation film 85, which are described below, are removed. FIG. 7B is a cross-sectional view taken along line V-V in FIG. 7A.

As shown in FIG. 7B, in the organic EL element 20 a light-blocking film 82 is formed on one surface of a transparent substrate 80 (21). An aperture (opening portion) 81 is formed in the light-blocking film 82, and the light-blocking film 82 is formed of a metallic material which is selected from chromium, a chromium alloy, aluminum, an aluminum alloy, etc. A transparent electrode 84 (22), and a contact portion 84A and an anode 84B which are connected to the transparent electrode 84 (22), are formed on the light-blocking film 82 via a transparent gate insulation film 83. An organic EL light-emitting layer 86 (23, 24, 25), which comprises a hole transport layer, a light-emitting layer and an electron transport layer, is provided in an opening portion of an overcoat insulation film 85 which is provided on the transparent electrode 84 and anode 84B. A cathode 87 (26), which also functions as a reflector and is formed of a metal thin film, is provided on the organic EL light-emitting layer 86 (23, 24, 25).

When a predetermined voltage is applied between the anode 84B and the cathode 87, holes are injected in the organic EL light-emitting layer 86 from the anode 84B, and electrons are injected in the organic EL light-emitting layer 86 from the cathode 87. Thereby, the holes and electrons are recombined there, and light is generated. As indicated by an arrow R in FIG. 7B, the light produced by the light generation passes through the gate insulation film 83 and aperture 81 and is emitted to the other surface side of the transparent substrate 80.

The light, which is emitted to the other surface side of the transparent substrate 80 via the aperture 81 as described above, is formed as a small-diameter light spot via the rod lens array unit 2B, as shown in FIG. 1, and is radiated as a beam spot on the photoconductor drum 1.

In the above structure, the light-blocking film 82 may be formed, for example, by extending the same metal thin film as the gate electrode layers of the select TFT 61 and driving TFT 62, shown in FIG. 5A, for driving the organic EL element 20.

The shape of the aperture 81, which is formed in the light-blocking film 82, defines the area of that light component emitted to the transparent substrate 80 side, which is part of the light that is isotropically emitted from the organic EL element 20 of each pixel of the light-emitting element array. Specifically, the aperture 81 determines the size and shape of the area of light emission from the light-emitting element, and forms the emission area in the present invention.

The aperture 81 (emission area) in the present embodiment is provided at a position opposed to the organic EL light-emitting layer 85. The size of the aperture 81 is slightly smaller than the size of the organic EL light-emitting layer 85, and the shape of the aperture 81 is such a rectangular shape that the width in a sub-scan direction, which is perpendicular to the main scan direction, is smaller than the width in the main scan direction, as will be described later.

In the above structure, the aperture 81 is formed in the light-blocking film 82 in order to define the area of light, and this aperture 81 forms the emission area. Alternatively, instead of providing the light-blocking film 82, the organic EL light-emitting layer 86 may be formed to have a desired shape or the cathode 87 or anode electrode 84 may be formed to have a desired shape or size, thereby defining the area of light that is emitted from the organic EL element 20 to the transparent substrate 80 side, and forming the emission area.

Next, a description is given of the relationship between the specific shape of the emission area in the present embodiment and the driving method of the pixel.

FIG. 8A to FIG. 8H show the shapes of emission areas and the shapes of beams spots radiated on the photoconductor drum, comparing the case in which the shape of the emission area is a general conventional one and the case in which the shape of the emission area is that in the present embodiment.

Figure 8A:
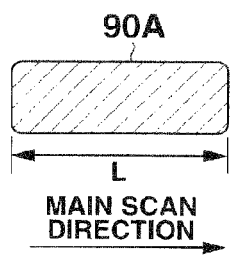
FIG. 8A to FIG. 8H show the shapes of emission areas and the shapes of beams spots radiated on the photoconductor drum, comparing the case in which the shape of the emission area is a general conventional one and the case in which the shape of the emission area is that in the first embodiment.
Figure 8B:
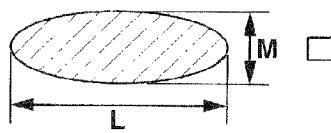
Figure 8C:
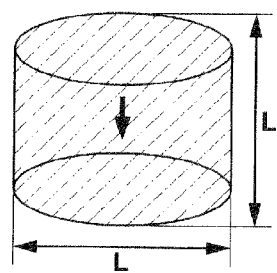
Figure 8D:
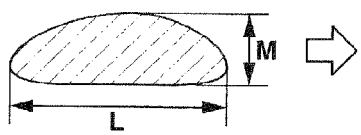
Figure 8E:
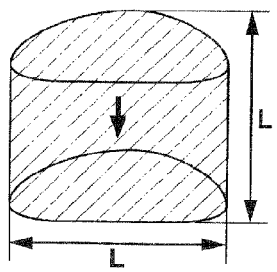
Figure 8F:
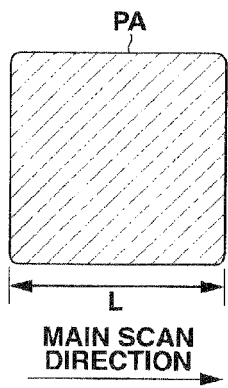

FIG. 8F shows the shape of an emission area PA which is generally used in the conventional art. As shown in FIG. 8F, the conventional emission area PA has a substantially square shape. For example, the width L in the direction of arrangement of pixels in the light-emitting element array, which is the main scan direction corresponding to the horizontal direction in FIG. 8F, is equal to the width L in the sub-scan direction which is perpendicular to the main scan direction and corresponds to the vertical direction in FIG. 8F.

Figure 8G:
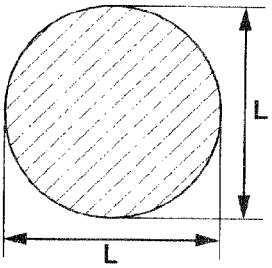

FIG. 8G relates to the case of using a rod lens array having an ideal lens structure which causes no distortion. FIG. 8G shows the shape of a beam spot, which is formed, via this rod lens array, on the peripheral surface of the photoconductor drum 1, that is, the object of light radiation, by instantaneous short-time light emission of the light-emitting element, the emission area of which has the shape of the above-described conventional emission area PA.

Figure 8H:
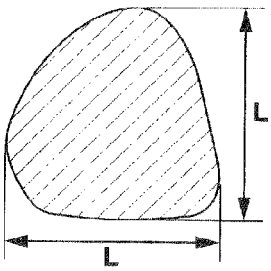

FIG. 8H relates to the case of using a rod lens array having an actual lens structure which causes some distortion. FIG. 8H shows the shape of a beam spot, which is formed, via this rod lens array, on the peripheral surface of the photoconductor drum 1 by instantaneous short-time light emission of the light-emitting element, the emission area of which has the shape of the above-described conventional emission area PA.

Specifically, in the conventional structure, the light-emitting element is driven so as to instantaneously emit light only for a short time. In the case where the rod lens array is an ideal one, the shape of the beam spot, which is formed at this time on the peripheral surface of the photoconductor drum 1, is an equal-size erect image and becomes, as shown in FIG. 8G, such a substantially circular shape that both the width in the main scan direction (the horizontal direction in FIG. 8G) and the width in the sub-scan direction (the vertical direction in FIG. 8G) are equal to the width L of the emission area PA.

However, in the actual rod lens array, many rod lenses are arrayed, and peripheral parts of optical images, which are formed by the respective lenses, overlap. In addition, the positional relationship between the respective lenses and light-emitting elements is not strictly uniform, and there is non-uniformity in optical characteristics between the respective lenses, such as refractive index distributions and angles of optical axes.

Consequently, the shape of the beam spot, which is actually formed on the peripheral surface of the photoconductor drum 1, has a distortion and is not circular, although the width in the main scan direction and the width in the sub-scan direction, for example, are approximately L. Specifically, the beam spot has a deformed shape, for example, as shown in FIG. 8H. Moreover, the shapes and areas of beam spots, which are associated with the emission areas PA of the respective pixels, become non-uniform. Since the non-uniform beam spots are successively arranged, this results in non-uniformity in print density.

On the other hand, FIG. 8A shows the shape of an emission area 90A in the present embodiment.

Specifically, as shown in FIG. 8A, the shape of the emission area 90A in this embodiment (corresponding to the shape of the aperture 81 in the structure shown in FIGS. 7A and 7B) is a rectangular shape having a long side with a width L in the direction of arrangement of pixels in the light-emitting element array, which is the main scan direction, and having a short side with a width M, which is less than the width L, in the sub-scan direction perpendicular to the main scan direction.

FIG. 8B shows the shape of a beam spot which is formed, via a rod lens array having an ideal lens structure which causes no distortion, on the peripheral surface of the photoconductor drum 1 by instantaneous short-time light emission of the light-emitting element, the emission area of which has the shape of the emission area 90A according to the present embodiment.

FIG. 8D shows the shape of a beam spot which is formed, via a rod lens array having an actual lens structure which causes some distortion, on the peripheral surface of the photoconductor drum 1 by instantaneous short-time light emission of the light-emitting element, the emission area of which has the shape of the emission area 90A according to the present embodiment.

Specifically, in the case where the rod lens array is an ideal one, the shape of the beam spot, which is formed on the peripheral surface of the photoconductor drum by instantaneous short-time light emission of the light-emitting element, becomes an elliptic shape, as shown in FIG. 8B, having the width L in the main scan direction and the width M in the sub-scan direction, the width in the sub-scan direction being less than the width in the main scan direction.

On the other hand, the shape of the beam spot, which is formed via the actual rod lens array by instantaneous light emission of the light-emitting element, has a distortion, as shown in FIG. 8D, due to the above-described non-uniformity in optical characteristics between the lenses of the rod lens array, although the width in the main scan direction is approximately L and the width in the sub-scan direction is approximately M.

To cope with this, the present embodiment further includes a structure for continuously driving the light-emitting element for a predetermined light-emission period, instead of causing the light-emitting element to instantaneously execute light emission for a short time. By this structure, the effect of distortion of the beam spot shape due to the actual rod lens array is suppressed.

Specifically, since the photoconductor drum 1 rotates at a fixed speed, if the light-emitting element continuously emits light for a predetermined light emission time, the beam spot, during this light emission period, moves over the peripheral surface of the photoconductor drum 1 in the sub-scan direction that is perpendicular to the main scan direction. In the present embodiment, the light emission period and the shape of the emission area 90A (the ratio of the short side to the long side) are set so that the width in the sub-scan direction (the vertical direction in the Figures) of the shape of the beam spot formed on the peripheral surface of the photosensitive drum 1 may become substantially equal to the width L in the main scan direction (the horizontal direction in the Figures) by the continuous light-emission of the light-emitting element for the predetermined light-emission period.

Thereby, even if there is a distortion in the beam spot shape due to the rod lens array, the effect of the distortion can be reduced, the uniformity in print density in each pixel can be improved, and the non-uniformity in the print result can be decreased. This will be explained below in greater detail.

FIG. 8C shows, by way of example, the shape of a beam spot which is formed on the peripheral surface of the photoconductor drum 1 when the light emission by the light-emitting element is continued for a predetermined light-emission period, in the case where the rod lens array is the ideal one, as shown FIG. 8B, and the elliptic beam spot shape is obtained.

On the other hand, FIG. 8E shows, by way of example, the shape of a beam spot which is formed on the peripheral surface of the photoconductor drum 1 when the light emission by the light-emitting element is continued for a predetermined light-emission period, in the case where the beam spot shape with a distortion is obtained with the actual rod lens array, as shown FIG. 8D.

The shape of the beam spot, which is formed on the peripheral surface of the photoconductor drum 1 in the present embodiment, is determined by the shape of the beam spot which is formed on the peripheral surface of the photoconductor drum by the instantaneous light emission of the light-emitting element, and the distance by which the beam spot moves over the peripheral surface of the photoconductor drum 1 during the light-emission period by the rotation of the photoconductor drum 1. The light-emission period is set within the 1 line time that is allocated to the print of one line. The light emission of the light-emitting element is executed with the cycle of this 1 line period. The light-emission period is so set that the shape of the beam spot, which is formed on the peripheral surface of the photoconductor drum 1 in the 1 line time of one cycle, may become a shape with an aspect ratio of about 1:1.

In other words, the shape of the emission area 90A and the corresponding light-emission period are so set that the shape of the beam spot, which is formed on the peripheral surface of the photoconductor drum 1 in the light-emission period that is provided in the 1 line time, may become such a shape that the width in the vertical direction that is the sub-scan direction is substantially equal to the width L in the horizontal direction that is the main scan direction.

In this case, even in the state in which distortion occurs in the beam spot shape by the instantaneous light emission with the rod lens array, as shown in FIG. 8E, the resultant shape of the beam spot formed on the peripheral surface of the photoconductor drum 1 becomes substantially similar to the beam spot shape which is obtained in the case where no distortion occurs in the beam spot shape by the instantaneous light emission, as shown in FIG. 8C.

Thereby, even in the case where there is non-uniformity in optical characteristics between the rod lenses that constitute the rod lens array, it becomes possible to suppress non-uniformity in the beam spot shapes associated with the light-emitting elements of the light-emitting element array, that is, non-uniformity in print density, and to suppress occurrence of non-uniformity in the print result.

Next, the relationship between the shape, which is set for the emission area 90A, and the light-emission period is explained.

As has been described above, the emission area 90A in the present embodiment has the rectangular shape having the long side (width L) in the main scan direction and the short side (width M) in the sub-scan direction that is perpendicular to the main scan direction.

The ratio of the light-emission period to the cycle period corresponding to the 1 line time, that is, the value of the duty ratio of the light-emission period, and the value of the ratio (M:L) between the short side and long side of the rectangle of the emission area 90A are correlated. In the case where the value of the duty ratio of the light-emission period is set at a certain value, the ratio between the short side and long side of the rectangle of the emission area 90A is determined in accordance with the value of the duty ratio. On the other hand, in the case where the ratio between the short side and long side of the rectangle of the emission area 90A is set at a certain value, the value of the duty ratio of the light-emission period is determined in accordance with the ratio between the short side and long side of the rectangle of the emission area 90A.

Specifically, assume the case in which the cycle period is 1, and the light-emission period is set at ½ of the cycle period, that is, the duty ratio of 50%. In this case, if the ratio (M:L) of the short side to the long side of the emission area 90A is 0.5:1, the width in the sub-scan direction of the shape of the beam spot, which is formed in the light-emission period of ½, becomes 0.5 (corresponding to the width M of the short side of the emission area 90A)+0.5 (corresponding to the light-emission period)=1, with the width of the long side being set at 1. Accordingly, the beam spot having the shape with an aspect ratio of about 1:1 can be obtained.

In addition, assume the case in which the light-emission period is set at ¼ of the cycle period, that is, the duty ratio of 25%. In this case, if the ratio of the short side to the long side of the emission area 90A is 0.75:1, the width in the sub-scan direction of the shape of the beam spot, which is formed in the light-emission period of ¼, becomes 0.75 (corresponding to the width M of the short side of the emission area 90A)+0.25 (corresponding to the light-emission period)=1, with the width of the long side being set at 1. Accordingly, in this case, too, the beam spot having the shape with an aspect ratio of about 1:1 can be obtained.

Specifically, in the case where the value of the duty ratio of the light-emission period is set at P, it should suffice if the ratio (M/L) of the short side to the long side of the rectangle of the emission area 90A is set at (1−P). On the other hand, in the case where the ratio (M/L) of the short side to the long side of the rectangle of the emission area 90A is set at Q, it should suffice if the duty ratio of the light-emission period is set at (1−Q).

As has been described above, in the present embodiment, the shape of the emission area of the light-emitting element of each pixel of the light-emitting element array is the rectangular shape having the long side in the main scan direction that is the direction of arrangement of pixels which are arrayed, and having the short side in the sub-scan direction perpendicular to the main scan direction. The ratio between the short side and long side of the rectangular shape is determined on the basis of the ratio of the light-emission period to the cycle period, i.e. the duty ratio. By the active driving using the active elements in the pixel driving circuit, control is executed to continuously perform exposure for a predetermined light-emission period in the sub-scan direction perpendicular to the main scan direction in accordance with the rotation of the photoconductor drum 1.

The present invention is not limited to the active driving using the active elements. Passive driving, for instance, may be adopted if control can be executed to continuously perform exposure for a predetermined light-emission period.

Thereby, even in the case where the shape of a beam spot which is instantaneously formed on the peripheral surface of the photoconductor drum 1 has a distortion due to the combination of lenses which constitute the rod lens array unit 2B for focusing the emission light of the light-emitting element on the peripheral surface of the photoconductor drum 1, the effect of the distortion can be reduced in the shape of a resultant beam spot which is formed by continuous exposure on the peripheral surface of the photoconductor drum 1. Hence, the uniformity in print density in each pixel of the light-emitting element array can be improved, and the non-uniformity in the print result can be decreased.

In the present embodiment, the case in which the organic EL element 20 has the bottom emission structure has been described. Alternatively, the organic EL element 20 may have a top emission structure. In this case, too, the above-described operation is applicable, and the same advantageous effects by this operation can be obtained.

Second Embodiment

Next, a second embodiment of the present invention is described.

To begin with, a driving method of light-emitting elements of a light-emitting element array in this embodiment is described.

The light-emitting elements of the respective pixels in this embodiment are composed by a passive structure which uses no active element. The light-emitting elements are driven by a driving method based on a passive matrix driving method.

Figure 9A:
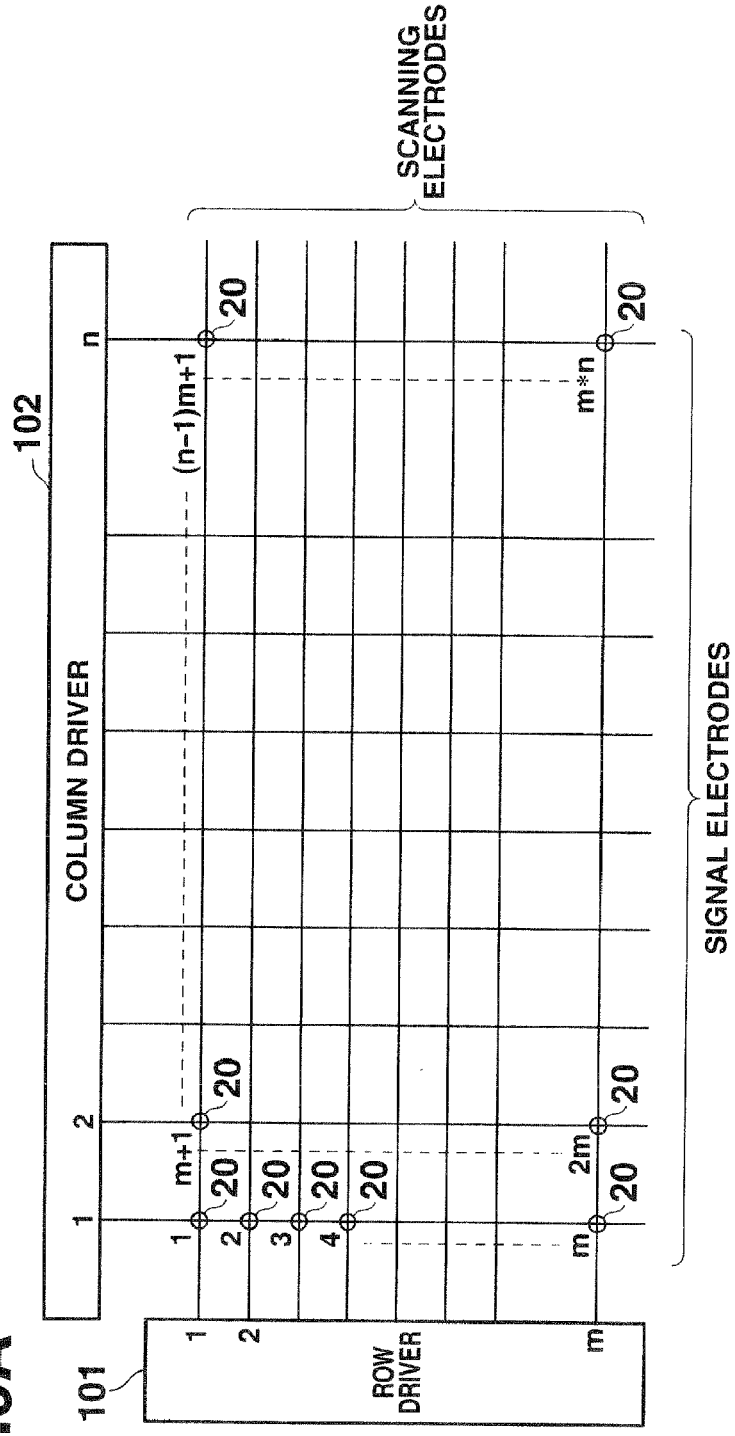
FIG. 9A and FIG. 9B are views for explaining the driving principle of a passive matrix driving method, and the structure of a light-emitting element array according to a second embodiment of the invention.
Figure 9B:
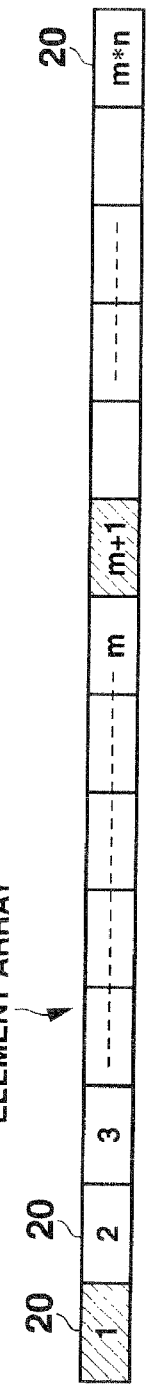

The circuit structure of the passive matrix driving method for executing light-emission driving of the organic EL element 20 of each light-emitting element, and this driving method are first described. FIG. 9A and FIG. 9B are views for explaining the driving principle of the passive matrix driving method, and the structure of the light-emitting element array according to this embodiment. FIG. 10A and FIG. 10B are views for describing the structure of the driving circuit for driving the light-emitting elements of the light-emitting element array according to this embodiment.

Specifically, FIG. 9A shows the driving principle of the passive matrix.

As shown in FIG. 9A, a massive matrix panel is configured such that a plurality of scanning electrodes and a plurality of signal electrodes are disposed to cross each other, and a plurality of light-emitting elements, which are composed of organic EL elements 20, are arranged in a matrix. In each light-emitting element, an organic EL element 20 is composed such that an EL layer is interposed between the scanning electrode and signal electrode, which function as an anode and a cathode, respectively. In this case, if the number of scanning electrodes is m and the number of signal electrodes is n (m, n=a natural number of 2 or more), a matrix having an (m×n) number of intersections is formed, and this number of light-emitting elements can be disposed.

In the driving of this passive matrix panel, a row driver 101 and a column driver 102 are provided. Bias voltages are successively applied from the row driver 101 and column driver 102 at a predetermined timing to the scanning electrodes and signal electrodes. Thereby, voltages are applied to the anodes and cathodes sandwiching organic layers of the organic EL elements 20 which are formed at the intersections of the scanning electrodes and signal electrodes.

In the present embodiment, the light-emitting element array, which is provided in the case unit 2A of the exposing device 2 and in which a plurality of light-emitting elements are linearly arranged, is formed by re-arranging the matrix-arrayed light-emitting elements, shown in FIG. 9A, in a line or lines. FIG. 9B shows an example of the arrangement of the light-emitting elements of the light-emitting element array according to the present embodiment. In this example, the light-emitting elements are arranged in a single line. In this case, an m-number of light-emitting elements, which are arranged in the horizontal direction in FIG. 9A, correspond to an m-number of light-emitting elements which are arranged in the column direction of the (m×n) number of matrix-arrayed light-emitting elements shown in FIG. 9A.

FIG. 10A shows the structure of connection between the light-emitting element array, row driver 101 and column driver 102 in the case where the light-emitting elements are structured as shown in FIG. 9B. FIG. 10B shows a detailed structure of connection between the row driver 101, column driver 102 and each light-emitting element of the light-emitting element array, which are shown in FIG. 10A.

As shown in FIG. 10A and FIG. 10B, the light-emitting element array comprises an n-number of groups (20G1 to 20Gn) each consisting of an m-number of light-emitting elements (organic EL elements 20). The m-number of light-emitting elements, which are included in each group, correspond to an m-number of light-emitting elements which are arranged in the column direction of the matrix-arrayed light-emitting elements shown in FIG. 9A. The structure of connection between the row driver 101, column driver 102 and each light-emitting element of the light-emitting element array is substantially equivalent to the structure of connection, shown in FIG. 9A, between the passive matrix panel, row driver 101 and column driver 102.

Specifically, signal lines (column 1, column 2, . . . , n), each of which is commonly connected to the m-number of light-emitting elements (organic EL elements 20) of an i-th (i=1, 2, . . . , n) group of the light-emitting element array, correspond to the plural signal electrodes in FIG. 9A, and are connected to output terminals of the column driver 102.

In addition, signal lines (row 1, row 2, . . . , row m), each of which is commonly connected to a j-th (j=1, 2, . . . , m) light-emitting element (organic EL element 20) of each group of the light-emitting element array, correspond to the plural scanning electrodes in FIG. 9A, and are connected to output terminals of the row driver 101.

In the driving by the row driver 101 and column driver 102, the row driver 101 successively renders active the row 1 row 1, row 2, . . . , row m, which correspond to the respective scanning electrodes, during the period of the 1 line time which is allocated to 1-line printing with reference to a horizontal sync signal Hsync (not shown), and the column driver 102 supplies, during this period, data, which is based on image data, to the column 1, column 2, . . . , n, which correspond to the respective signal electrodes, thereby controlling the light emission amount of each light-emitting element (organic EL element 20).

For example, while the row driver 101 renders active the scanning electrode, row 1, the column driver 102 writes data, which is based on image data, in the signal electrodes, column 1, column 2, . . . , n, thereby controlling the light emission amounts of the light-emitting elements (organic EL elements 20) which are disposed at the intersections corresponding to the scanning electrode, row 1.

The specific structure of the light-emitting element (organic EL element 20) in the present embodiment is, for example, equivalent to the structure, shown in FIG. 7A, 7B, according to the first embodiment. The light-blocking film 82 is similarly provided, and the shape of the aperture 81 that is formed in the light-blocking film 82 determines the size and shape of the emission area for light emission from the light-emitting element. The aperture 81 determines the size and shape of the area of light emission from the light-emitting element, and forms the emission area in the present invention.

Instead of providing the light-blocking film 82, the shape of the organic EL light-emitting layer 86 or the shape of the cathode 87 or anode 84 may be set to a desired shape or size. Thereby, the area of light, which is emitted from the organic EL element 20 to the transparent substrate 80 side, may be defined, and the emission area may be formed.

Next, a description is given of the relationship between the specific shape of the emission area in the present embodiment and the driving method of the pixel.

FIG. 11A to FIG. 11H show the shapes of emission areas and the shapes of beams spots radiated on the photoconductor drum, comparing the case in which the shape of the emission area is a general conventional one and the case in which the shape of the emission area is that in the present embodiment.

Figure 11A:
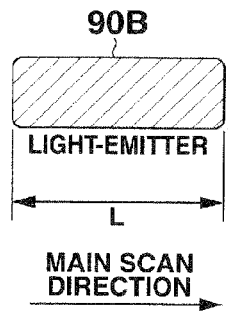
FIG. 11A to FIG. 11H show the shapes of emission areas and the shapes of beam spot radiated on the photoconductor drum, comparing the case in which the shape of the emission area is a general conventional one and the case in which the shape of the emission area is that in the second embodiment.
Figure 11B:
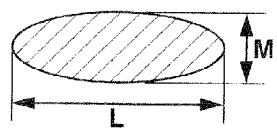
Figure 11C:
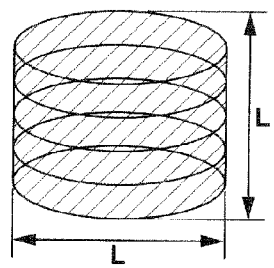
Figure 11D:
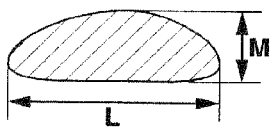
Figure 11E:
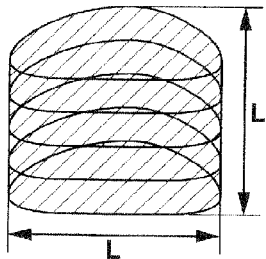
Figure 11F:
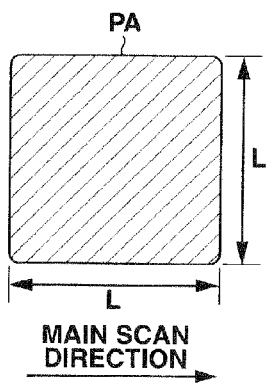

FIG. 11F shows the shape of an emission area PA which is generally used in the conventional art. As shown in FIG. 11F, the conventional emission area PA has a substantially square shape. For example, the width L in the direction of arrangement of pixels in the light-emitting element array, which is the main scan direction corresponding to the horizontal direction in FIG. 11F, is substantially equal to the width L in the sub-scan direction which is perpendicular to the main scan direction and corresponds to the vertical direction in FIG. 11F.

Figure 11G:
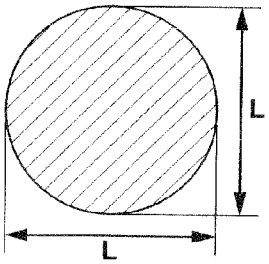

FIG. 11G relates to the case of using a rod lens array having an ideal lens structure which causes no distortion. FIG. 11G shows the shape of a beam spot, which is formed, via this rod lens array, on the peripheral surface of the photoconductor drum 1, that is, the object of light radiation, by instantaneous short-time light emission of the light-emitting element, the emission area of which has the shape of the above-described conventional emission area PA.

Figure 11H:
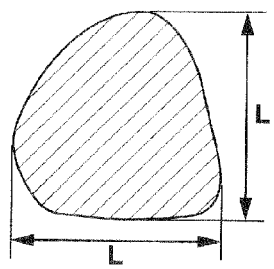

FIG. 11H relates to the case of using a rod lens array having an actual lens structure which causes some distortion. FIG. 11H shows the shape of a beam spot, which is formed, via this rod lens array, on the peripheral surface of the photoconductor drum 1 by instantaneous short-time light emission of the light-emitting element, the emission area of which has the shape of the above-described conventional emission area PA.

Specifically, in the conventional structure, the light-emitting element is driven so as to instantaneously emit light only for a short time. In the case where the rod lens array is an ideal one, the shape of the beam spot, which is formed at this time on the peripheral surface of the photoconductor drum 1, is an equal-size erect image and becomes, as shown in FIG. 11G, such a substantially circular shape that both the width in the main scan direction (the horizontal direction in FIG. 11G) and the width in the sub-scan direction (the vertical direction in FIG. 11G) are equal to the width L of the emission area PA.

However, in the actual rod lens array, many rod lenses are arrayed, and peripheral parts of optical images, which are formed by the respective lenses, overlap. In addition, the positional relationship between the respective lenses and light-emitting elements is not strictly uniform, and there is non-uniformity in optical characteristics between the respective lenses, such as refractive index distributions and angles of optical axes.

Consequently, the shape of the beam spot, which is actually formed on the peripheral surface of the photoconductor drum 1, has a distortion and is not circular, although the width in the main scan direction and the width in the sub-scan direction, for example, are approximately L. Specifically, the beam spot has a deformed shape, for example, as shown in FIG. 11H. Moreover, the shapes and areas of beam spots, which are associated with the emission areas PA of the respective pixels, become non-uniform. Since the non-uniform beam spots are successively arranged, this results in non-uniformity in print density.

On the other hand, FIG. 11A shows the shape of an emission area 90B in the present embodiment.

Specifically, as shown in FIG. 11A, the shape of the emission area 90B in this embodiment is a rectangular shape having a long side with a width L in the direction of arrangement of light-emitting elements in the light-emitting element array, which is the main scan direction, and having a short side with a width M, which is less than the width L, in the sub-scan direction perpendicular to the main scan direction.

FIG. 11B shows the shape of a beam spot which is formed, via a rod lens array having an ideal lens structure which causes no distortion, on the peripheral surface of the photoconductor drum 1 by instantaneous short-time light emission of the light-emitting element, the emission area of which has the shape of the emission area 90B according to the present embodiment.

FIG. 11D shows the shape of a beam spot which is formed, via a rod lens array having an actual lens structure which causes some distortion, on the peripheral surface of the photoconductor drum 1 by instantaneous short-time light emission of the light-emitting element, the emission area of which has the shape of the emission area 90B according to the present embodiment.

Specifically, in the case where the rod lens array is an ideal one, the shape of the beam spot, which is formed on the peripheral surface of the photoconductor drum by instantaneous short-time light emission of the light-emitting element, becomes an elliptic shape, as shown in FIG. 11B, having the width L in the main scan direction and the width M in the sub-scan direction, the width in the sub-scan direction being less than the width in the main scan direction.

On the other hand, the shape of the beam spot, which is formed via the actual rod lens array by instantaneous light emission of the light-emitting element having the shape of the emission area 90B, has a distortion, as shown in FIG. 11D, due to the above-described non-uniformity in optical characteristics between the lenses of the rod lens array, although the width in the main scan direction is approximately L and the width in the sub-scan direction is approximately M.

To cope with this, the present embodiment further includes a structure for driving the light-emitting element by a plural number of times at predetermined light-emission intervals in the 1 line time allocated to 1-line printing, instead of instantaneously driving the light-emitting element only once. By this structure, the effect of distortion of the beam spot shape due to the actual rod lens array is suppressed.

Specifically, in the conventional structure, each of the light-emitting elements of the light-emitting element array is configured to emit light only once in every 1 cycle time which corresponds to the 1 line time.

By contrast, in the present embodiment, each of the light-emitting elements of the light-emitting element array is configured to emit light more than once in every 1 cycle time.

In this case, since the photoconductor drum 1 rotates at a constant speed, if the light-emitting element emits light by a plural number of times, the position of the beam spot, which is formed on the peripheral surface of the photoconductor drum 1 by each light emission, is displaced by a distance corresponding to the movement of the peripheral surface of the photoconductor drum 1 in each light-emission interval. As a result, the beam spot, which is formed on the peripheral surface of the photoconductor drum 1, has such a shape that a plurality of beam spots, which are formed by a plural number of times of light emission of the light-emitting element, overlap with displacements over the distance of movement of the peripheral surface of the photoconductor drum 1, which corresponds to the light-emission intervals.

In the present embodiment, the number of times of light emission and the shape of the emission area (the ratio of the short side to the long side) are so set that the width in the sub-scan direction (the vertical direction in the Figures) of the shape of the beam spot formed on the peripheral surface of the photosensitive drum 1 may become substantially equal to the width L in the main scan direction (the horizontal direction in the Figures) by the plural number of times of light emission of the light-emitting element in the above-described manner.

Thereby, even if there is a distortion in the beam spot shape due to the rod lens array, the effect of the distortion can be reduced, the uniformity in print density associated with each light-emitting element can be improved, and the non-uniformity in the print result can be decreased. This will be explained below in greater detail.

FIG. 11C shows, by way of example, the shape of beam spot which is formed on the peripheral surface of the photoconductor drum 1 when the light emission by the light-emitting element is executed five times at regular intervals, in the case where the rod lens array is the ideal one, as shown FIG. 11B, and the elliptic beam spot shape is obtained by instantaneous single-time light emission of the light-emitting element.

On the other hand, FIG. 11E shows, by way of example, the shape of a beam spot which is formed on the peripheral surface of the photoconductor drum 1 when the light emission by the light-emitting element is executed five times at regular intervals, in the case where the beam spot shape with a distortion is obtained with the actual rod lens array by instantaneous single-time light emission of the light-emitting element, as shown FIG. 11D.

The shape of the beam spot, which is formed on the peripheral surface of the photoconductor drum 1 in the present embodiment, is determined by the shape of the beam spot which is formed on the peripheral surface of the photoconductor drum by the instantaneous single-time light emission of the light-emitting element, the distance by which the peripheral surface of the photoconductor drum 1 moves during the light-emission interval by the rotation of the photoconductor drum 1, and the number of times of light emission.

The plural number of times of light emission is executed, for example, at equal intervals. At this time, the light-emission interval is set at a time which is calculated by dividing the 1 line time by the number of times of light emission. The shape of the emission area 90B and the number of times of light emission are determined so that the shape of the beam spot, which is formed on the peripheral surface of the photoconductor drum 1 by the plural number of times of light emission, may become such a shape that the width in the vertical direction that is the sub-scan direction is substantially equal to the width in the horizontal direction that is the main scan direction.

In this case, even in the state in which distortion occurs in the beam spot shape by the instantaneous single-time light emission with the rod lens array, as shown in FIG. 11E, the resultant shape of the beam spot formed on the peripheral surface of the photoconductor drum 1 becomes substantially similar to the beam spot shape which is obtained in the case where no distortion occurs in the beam spot shape by the instantaneous light emission, as shown in FIG. 11C.

Thereby, even in the case where there is non-uniformity in optical characteristics between the rod lenses that constitute the rod lens array, it becomes possible to suppress non-uniformity in the beam spot shapes associated with the light-emitting elements of the light-emitting element array, that is, non-uniformity in print density, and to suppress occurrence of non-uniformity in the print result.

Next, the relationship between the shape, which is set for the emission area 90B, and the number of times of light emission is explained.

As has been described above, the emission area 90B in the present embodiment has the rectangular shape having the long side (width L) in the main scan direction and the short side (width M) in the sub-scan direction that is perpendicular to the main scan direction.

The value of the number of times of light emission in the cycle time corresponding to the above-described 1 line time and the value of the ratio (M:L) between the short side and long side of the rectangle of the emission area 90B are correlated. In the case where the value of the number of times of light emission is set at a certain value, the ratio between the short side and long side of the rectangle of the emission area 90B is determined in accordance with the value of the number of times of light emission. On the other hand, in the case where the ratio between the short side and long side of the rectangle of the emission area 90B is set at a certain value, the value of the number of times of light emission is determined in accordance with the ratio between the short side and long side of the rectangle of the emission area 90B.

Specifically, in the case where the cycle period is 1, if the number of times of light emission is 2, the light-emission interval is 0.5. In this case, if the ratio (M:L) of the short side to the long side of the emission area 90B is 0.5:1, the width in the sub-scan direction of the shape of the beam spot, which is formed by two-time light emission, becomes 0.5 (corresponding to the width M of the short side of the emission area 90B)+0.5 (corresponding to the light-emission interval×1)=1, with the width of the long side being set at 1. Accordingly, the beam spot having the shape with an aspect ratio of about 1:1 can be obtained.

In addition, if the number of times of light emission is 4, the light-emission interval is 0.25. In this case, if the ratio of the short side to the long side of the emission area 90B is 0.25:1, the width M in the sub-scan direction of the shape of the beam spot, which is formed by four-time light emission, becomes 0.25 (corresponding to the width M of the short side of the emission area 90B)+0.25×3 (corresponding to the light-emission interval×3)=1, with the width of the long side being set at 1. Accordingly, in this case, too, the beam spot having the shape with an aspect ratio of about 1:1 can be obtained.

Specifically, if the value of the number of times of light emission is set at R, it should suffice if the ratio (M/L) of the short side to the long side of the emission area 90B is set at R. On the other hand, if the ratio (M/L) of the short side to the long side of the emission area 90B is set at S, it should suffice if the value of the number of times of light emission is set at S.

As has been described above, in the present embodiment, the shape of the emission area of the light-emitting element of each pixel of the light-emitting element array is the rectangular shape having the long side in the main scan direction that is the direction of arrangement of pixels which are arrayed, and having the short side in the sub-scan direction perpendicular to the main scan direction. The passive matrix driving is executed in a manner to perform light emission more than once during the formation of dots. The ratio between the short side and long side of the emission area is determined in accordance with the number of times of light emission during the 1 line time.

Thereby, even in the case where the shape of a beam spot which is instantaneously formed on the peripheral surface of the photoconductor drum 1 has a distortion due to the combination of lenses which constitute the rod lens array unit 2B for focusing the emission light of the light-emitting element on the peripheral surface of the photoconductor drum 1, the effect of the distortion can be reduced in the shape of a resultant beam spot which is formed on the peripheral surface of the photoconductor drum 1 by exposure by a plural number of times of light emission. Hence, the uniformity in print density in each pixel of the light-emitting element array can be improved, and the non-uniformity in the print result can be decreased.

In the present embodiment, the case in which the organic EL element 20 principally has the bottom emission structure has been described. Alternatively, the organic EL element 20 may have a top emission structure. In this case, too, the above-described operation is applicable, and the same advantageous effects by this operation can be obtained.

The present invention is not limited to the above-described embodiments. In practice, various modifications may be made without departing from the spirit of the invention. The functions, which are executed in the above-described embodiments, may be properly combined and practiced as much as possible. The above-described embodiments include inventions in various stages, and various inventions can be derived from proper combinations of structural elements disclosed herein. For example, even if some structural elements in all the structural elements disclosed in the embodiments are omitted or combined, if advantageous effects can be achieved, the structure without such structural elements can be derived as an invention.

What is claimed is:

1. An exposing device which radiates light on a photoconductor drum which rotates, thereby executing exposure, the exposing device comprising:
   a light-emitting element unit including a plurality of light-emitting elements, each having an emission area which emits generated light, the emission area having a rectangular shape with a long side along a direction perpendicular to a rotational direction of the photoconductor drum, and a short side along the rotational direction, the short side being shorter than the long side;
   a lens unit which focuses the light, which is emitted from the emission areas of the light-emitting elements, on a peripheral surface of the photoconductor drum, thereby executing exposure and forming on the peripheral surface beam spots, each of the beam spots having a shape corresponding to the shape of its respective emission area; and
   a driving circuit which drives the light-emitting element unit at a predetermined cycle time and causes each of the light-emitting elements to emit light a plurality of times, at a predetermined time interval, within the cycle time, thereby forming the beam spots on the peripheral surface of the photoconductor drum each time the light-emitting element is caused to emit light, the beam spots being formed at positions where the beam spots partially overlap one another along the rotational direction,
   wherein a width of the beam spots formed on the peripheral surface within the cycle time, in the rotational direction, is made to be close to a width of the beam spots in the direction perpendicular to the rotational direction.

2. The device according to claim 1, wherein the plurality of light-emitting elements are linearly arranged in the direction perpendicular to the rotational direction, and a plurality of said emission areas are provided in association with the plurality of light-emitting elements, respectively.

3. The device according to claim 2, wherein the lens unit is provided in association with the plurality of emission areas, and comprises a lens array in which a plurality of rod lenses are arranged in an array.

4. The device according to claim 1, wherein the light-emitting elements in the light-emitting element unit comprise organic EL elements.

5. The device according to claim 1, wherein the time interval is set such that two beam spots caused by two consecutive emissions of light are formed at positions having an overlapping area.

6. The device according to claim 5, wherein the time interval is set such that a distance between the two beam spots caused by the two consecutive emissions of light in a direction along the rotational direction is substantially half of a maximum value of the width in a direction along the rotational direction of the beam spots.

7. An image forming apparatus which performs printing by an electrophotographic method based on image data, the image forming apparatus comprising:
   a photoconductor drum which rotates;
   a light-emitting element unit including a plurality of light-emitting elements, each having an emission area which emits generated light, the emission area having a rectangular shape with a long side along a direction perpendicular to a rotational direction of the photoconductor drum, and a short side along the rotational direction, the short side being shorter than the long side;
   a lens unit which focuses the light, which is emitted from the emission areas of the light-emitting elements, on a peripheral surface of the photoconductor drum, thereby executing exposure and forming on the peripheral surface beam spots, each of the beam spots having a shape corresponding to the shape of its respective emission area; and
   a driving circuit which drives each of the light-emitting elements of the light-emitting element unit based on the image data, at a predetermined cycle time, and causes each of the light-emitting elements to emit light at a plurality of times, at a predetermined time interval, within the cycle time, thereby forming the beam spots on the peripheral surface of the photoconductor drum each time the light-emitting element is caused to emit light, the beam spots being formed at positions where the beam spots partially overlap one another along the rotational direction,
   wherein a width of the beam spots formed on the peripheral surface within the cycle time, in the rotational direction, is made to be close to a width of the beam spots in the direction perpendicular to the rotational direction.

8. The apparatus according to claim 7, wherein the plurality of light-emitting elements in the light-emitting element unit are linearly arranged in the direction perpendicular to the rotational direction, and
   wherein the lens unit is provided in association with the emission areas of the light-emitting elements, and comprises a lens array in which a plurality of rod lenses are arranged in an array.

9. The apparatus according to claim 7, wherein the plurality of light-emitting elements in the light-emitting element unit comprise organic EL elements.

10. The apparatus according to claim 7, wherein the time interval is set such that two beam spots caused by two consecutive emissions of light are formed at positions having an overlapping area.

11. The apparatus according to claim 10, wherein the time interval is set such that a distance between the two beam spots caused by the two consecutive emissions of light in a direction along the rotational direction is substantially half of a maximum value of the width in a direction along the rotational direction of the beam spots.

12. A driving control method of an image forming apparatus which performs printing by an electrophotographic method based on image data, the apparatus comprising a light-emitting element unit including a plurality of light-emitting elements each having an emission area which emits generated light, the emission area having a rectangular shape with a long side along a direction perpendicular to a rotational direction of a photoconductor drum which rotates, and a short side along the rotational direction, the short side being shorter than the long side, the method comprising:

driving each of the light-emitting elements of the light-emitting element unit based on the image data, at a predetermined cycle time, and causing each of the light-emitting elements to emit light at a plurality of times, at a predetermined time interval, within the cycle time; and causing the light emitted from the emission area by the light emission to be focused on a peripheral surface of the photoconductor drum, and forming on the peripheral surface a beam spot having a shape corresponding to a shape of the emission area, and executing exposure, thereby forming the beam spot on the peripheral surface of the photoconductor drum each time the light-emitting elements are caused to emit light, the beam spots of the plurality of light-emitting elements being formed at positions where the beam spots partially overlap one another along the rotational direction, wherein a width of the beam spots formed on the peripheral surface within the cycle time, in the rotational direction, are made to be close to a width of the beam spots in the direction perpendicular to the rotational direction.

13. The method according to claim 12, wherein the time interval is set such that two beam spots caused by two consecutive emissions of light are formed at positions having an overlapping area.

14. The method according to claim 13, wherein the time interval is set such that a distance between the two beam spots caused by the two consecutive emissions of light in a direction along the rotational direction is substantially half of a maximum value of the width in a direction along the rotational direction of the beam spots.

* * * * *